United States Patent [19]
Kisor

[11] Patent Number: 6,104,720
[45] Date of Patent: Aug. 15, 2000

[54] DYNAMIC COMMUNICATION PATH SELECTION FOR DATA TRANSMISSION BETWEEN COMPUTERS

[75] Inventor: Gregory Hurst Kisor, Beaverton, Oreg.

[73] Assignee: Intel Corporation, Santa Clara, Calif.

[21] Appl. No.: 08/848,554

[22] Filed: Apr. 28, 1997

[51] Int. Cl.$^7$ .................................................. H04L 12/28
[52] U.S. Cl. ............................................. 370/431; 370/252
[58] Field of Search ...................... 370/431, 468, 370/464, 465, 352, 395, 401, 260, 264, 469, 229, 230, 231, 232, 233, 238, 252, 253, 437; 345/231, 330, 503, 504, 505, 506, 512, 519, 518, 508, 520, 521

[56] References Cited

U.S. PATENT DOCUMENTS

| | | | |
|---|---|---|---|
| 5,459,720 | 10/1995 | Iliev et al. | 370/394 |
| 5,659,542 | 8/1997 | Bell et al. | 370/496 |
| 5,701,465 | 12/1997 | Baugher et al. | 370/231 |
| 5,737,333 | 4/1998 | Civanlar et al. | 370/352 |
| 5,740,161 | 4/1998 | Porter et al. | 370/260 |
| 5,826,051 | 10/1998 | Porter et al. | 345/345 |
| 5,838,318 | 11/1998 | Porter et al. | 345/342 |
| 5,898,668 | 4/1999 | Shaffer | 370/230 |
| 5,898,673 | 4/1999 | Riggan et al. | 370/237 |
| 5,903,558 | 5/1999 | Jones et al. | 370/351 |

*Primary Examiner*—Dang Ton
*Assistant Examiner*—Phirin Sam
*Attorney, Agent, or Firm*—Kenyon & Kenyon

[57] ABSTRACT

A system transmits data, which includes a plurality of data types, over a plurality of communication paths. The system determines which of the plurality of communication paths are available for transmitting the data. The system then determines at least one desired quality of service characteristic for each of the data types. Finally, the system selects at least one of the available communication paths for transmitting each of the data types by matching the desired quality of service characteristics to the available communication paths.

6 Claims, 3 Drawing Sheets

DYNAMIC COMMUNICATION PATH SELECTION FOR DATA TRANSMISSION BETWEEN COMPUTERS

BACKGROUND OF THE INVENTION

The present invention is directed to data transmission between computers. More particularly, the present invention is directed to data transmission between computers on communication paths that are selected dynamically.

Computers typically have multiple communication paths available for transmitting data to other computers. Examples of communication paths include the public switched telephone network ("PSTN") path, an Ethernet local area network ("LAN") path, an Integrated Services Digital Network ("ISDN") path, and an Asynchronous Transfer Mode ("ATM") path. Each of these communication paths has differing characteristics that can affect how the data is transmitted. These characteristics are known as quality of service ("QOS") characteristics. Examples of QOS characteristics include bandwidth, latency, jitter and reliability.

Computer applications generate many different types of data that is transmitted to other computers or destination devices via a communication path. Examples of the different types of generated data include video data, audio data, control data, and non real-time application data. Some communication paths, because of their characteristics, are more suitable than others for transmitting different types of data. For example, audio data can be transmitted on an unreliable communication path with a small bandwidth, but the path should have low latency and small jitter. Video data can be transmitted on an unreliable communication path, but the path should have a higher bandwidth than with audio data, low latency and small jitter. Most control data requires less bandwidth than video data, but requires high reliability. Real-time control data, such as remote camera control, requires high reliability and very low latency.

A known method exists for dynamically linking multiple communication paths together to form a single large communication path to accommodate large bandwidth needs of data. Specifically, Multilink Point-to-Point Protocol ("MPPP") allows multiple ISDN communication paths to be linked together. MPPP adds and drops calls according to bandwidth needs. MPPP can also link multiple PSTN communication paths together. However, MPPP can only link a single type of communication path (i.e., ISDN or PSTN) together. Further, MPPP views the linked paths as a single large path. Therefore, MPPP does not transmit data on different communication paths based on transmission characteristics of the paths, or based on the type of data that is transmitted.

Based on the foregoing, there is a need for a method and apparatus that dynamically determines appropriate communication paths for transmitting data based on the characteristics of the available communication paths and the type of data.

SUMMARY OF THE INVENTION

One embodiment of the present invention is a system for transmitting data, which includes a plurality of data types, over a plurality of communication paths. The system determines which of the plurality of communication paths are available for transmitting the data. The system then determines at least one desired quality of service characteristic for each of the data types. Finally, the system selects at least one of the available communication paths for transmitting each of the data types by matching the desired quality of service characteristics to the available communication paths.

DETAILED DESCRIPTION

Figure 1:
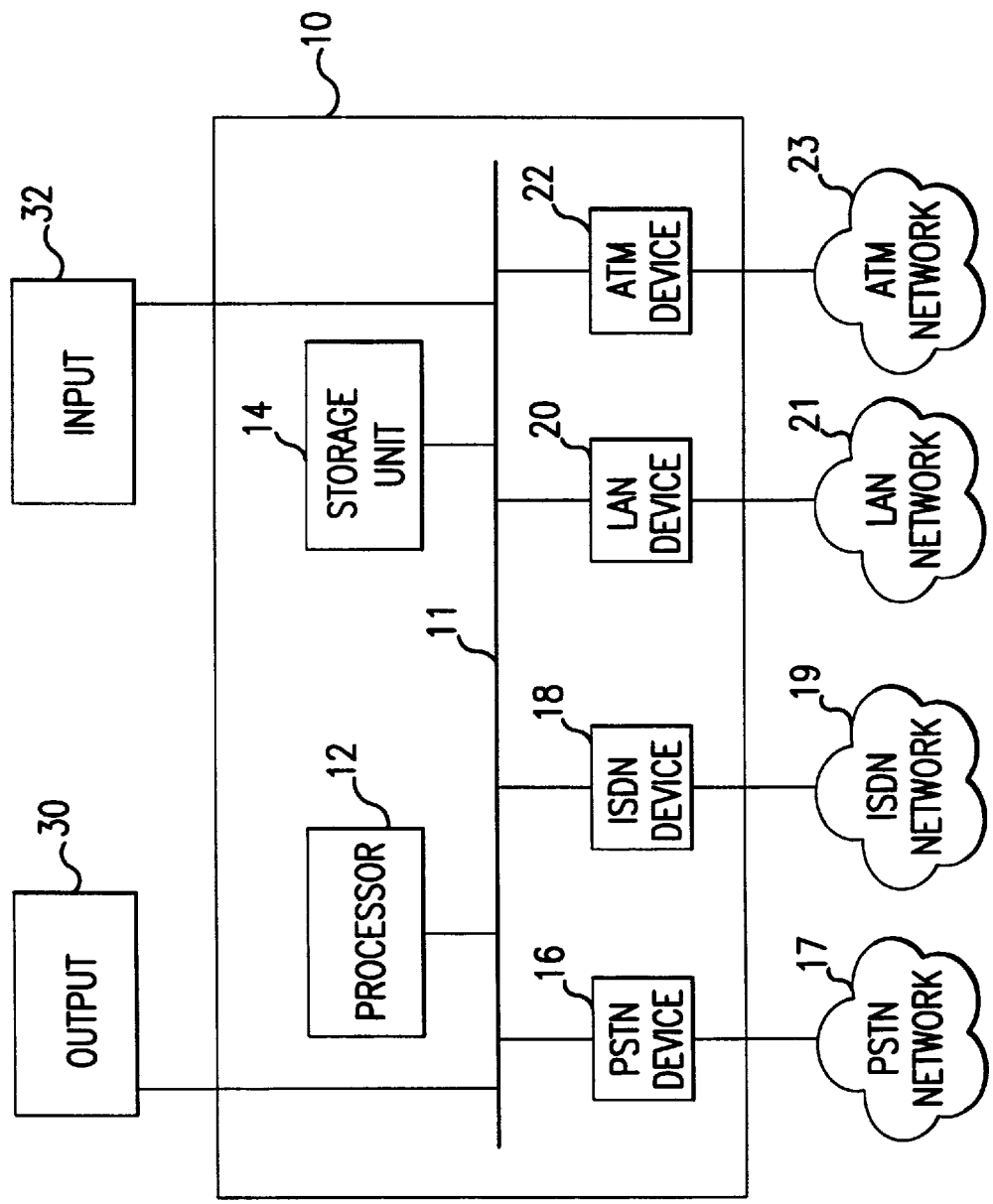
FIG. 1 is a block diagram of a computer that implements one embodiment of the present invention.

FIG. 1 is a block diagram of a computer that implements one embodiment of the present invention. The computer 10 is a general purpose computer that includes a bus 11. All components coupled to bus 11 communicate with each other in a known way.

Coupled to bus 11 is a processor 12 and a storage unit 14. Processor 12 may be, for example, a Pentium® or Pentium™ Pro processor from Intel Corp. Other processors may also be used. Storage unit 14 includes a plurality of storage devices. The storage devices typically include random access memory ("RAM"), read-only memory ("ROM") and a disk drive. Further coupled to bus 11 is an output device 30, e.g., a monitor, and an input device 32, e.g., a keyboard or mouse.

A plurality of communication interface devices are also coupled to bus 11 and to corresponding communication path networks which include communication paths. Communication interface devices in computer 10 include PSTN device 16 coupled to PSTN network 17, ISDN device 18 coupled to ISDN network 19, LAN device 20 coupled to LAN network 21, and ATM device 22 coupled to ATM network 23. Communication interface devices 16, 18, 20, 22 operate in a well known manner to enable processor 12 to send and receive data over the corresponding communication networks 17, 19, 21, 23. For example, PSTN device 16 includes a modem for modulating and demodulating data that is transmitted over PSTN network 17. Further, LAN device 20 includes a LAN adapter, such as an Ethernet adapter, for transmitting data over LAN network 21. In another embodiment of the present invention, communication interface devices 16, 18, 20, 22 are external to computer 10.

Figure 2:
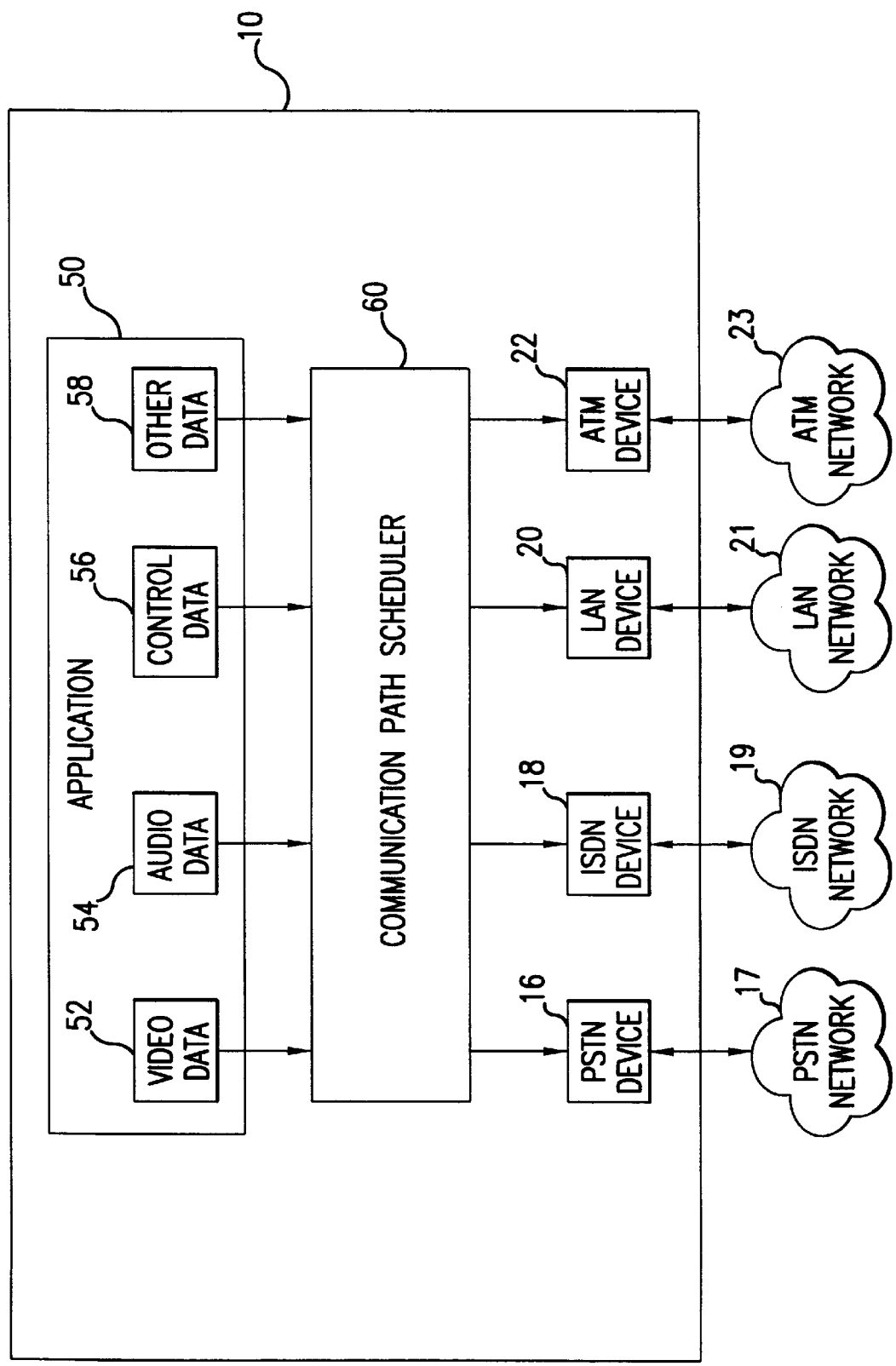
FIG. 2 is block diagram illustrating the data flow within one embodiment of the present invention.

FIG. 2 is block diagram illustrating the data flow within one embodiment of the present invention. Application 50 is a software application program or a plurality of application programs that is executed by processor 12 of computer 10 and stored in storage unit 14. Examples of application 50 include a word processing program, a spreadsheet, audio/visual conferencing software, multimedia games, etc. Application 50 generates a plurality of data types that must be transmitted to another computer or any other device via communication path networks 17, 19, 21, 23. The plurality of data types generated by application 50 include video data 52, audio data 54, control data 56, and other non-specific data 58.

In the present invention, all data that needs to be transmitted over a communication path by application 50 is first sent to communication path scheduler 60. Communication path scheduler 60, which is described in further detail below, sends that data to the appropriate communication interface device based on the type of data and the QOS characteristics of the communication paths associated with each communication interface device. Therefore, communication path scheduler 60 sends data 52, 54, 56, 58 that it receives from application 50 to either PSTN device 16, ISDN device 18, LAN device 20, or ATM device 22. The data is then transmitted over communication path networks 17, 19, 21, 23, respectively.

Communication path scheduler 60 is implemented using software or hardware, or any combination of each. In one embodiment, communication path scheduler 60 is implemented using software instructions, which are stored on storage unit 14 and executed by processor 12 shown in FIG. 1.

Figure 3:
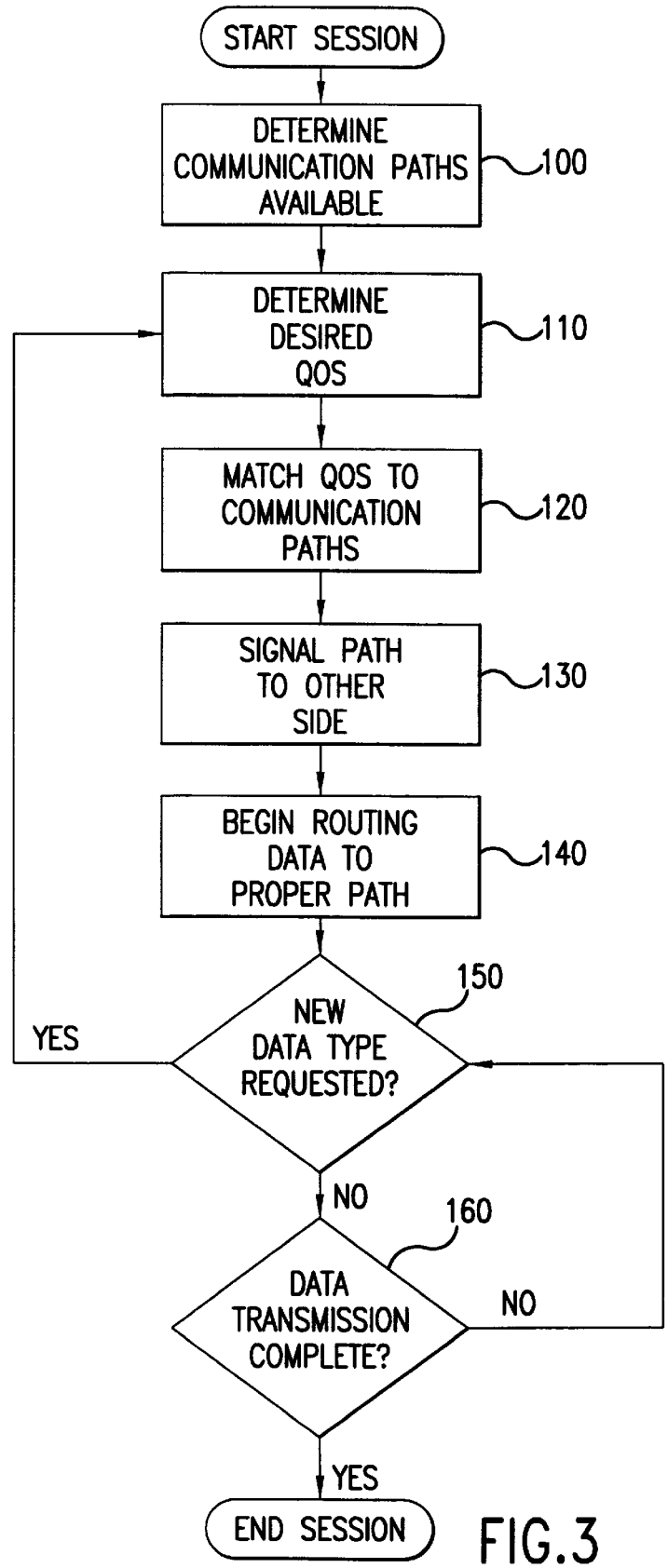
FIG. 3 is a flowchart of the steps performed by one embodiment of the present invention during one session of transmitting data generated by an application program.

FIG. 3 is a flowchart of the steps performed by communication path scheduler 60 during one session of transmitting data generated by application 50, executing on computer 10, to another device over a communication path. A session is the establishment and use of a communication connection between computer 10 and another device.

At step 100, communication path scheduler 60 determines what communication paths are available for sending data received from application 50 to the destination device specified by application 50. The paths are determined by looking up in a table the paths available to reach the destination device. The table stores all available communication paths from computer 10 to all possible destination devices for the session. In one embodiment, the table is stored in storage unit 14. In another embodiment, instead of using a table, application 50 sends a list of the available communication paths to communication path scheduler 60 along with the data.

At step 110, communication path scheduler 60 determines the desired QOS for each data type received from application 50. In one embodiment, communication path scheduler 60 determines the QOS by accessing a lookup table that provides the desired QOS for each data type. The lookup table is stored on storage unit 14. In another embodiment, application 50 specifies the QOS for each data type when the data is sent to communication path scheduler 60.

At step 120, communication path scheduler 60 matches the QOS to the communication paths available using known best fit methods. One example of a best fit method is first ordering the QOS characteristics for each data type generated by application 50, from most important to least important. For example, characteristics for video data might be ordered as bandwidth, jitter and latency. Another characteristic may be cost, which typically is ordered as the most important characteristic. The data types may also require a minimum bandwidth, and a maximum jitter and latency. Communication path scheduler 60 seeks a match for the data type characteristics with the available communication paths in the order of importance of the data type characteristics. A best fit would be the largest available bandwidth that is greater than the minimum required bandwidth, and the smallest available jitter and latency that is less than the minimum required jitter and latency for each data type. The matching of data types to available communication paths results in the selection of the communication paths used to transmit the data.

At step 130, a signal is transmitted to the destination devices that are to receive the data. The signal informs the destination devices what communication paths are being used to transmit the data. The signal can either be transmitted as separate control data on a communication path, or as initial bits of data added on to the data that is received from application 50 and subsequently transmitted.

At step 140, the data is routed to the proper communication interface device by communication path scheduler 60. This initiates the transmission of the data over communication paths associated with each communication interface device.

During the session, the data types generated by application 50 may change. Therefore, at step 150 communication path scheduler 60 determines if the data types received from application 50 have changed. If the data types have changed, communication path scheduler 60 returns to step 110 where the selected communication paths are reevaluated and selected again based on the new data types. This provides dynamic selection of the communication paths.

If at step 150 the received data types have not changed, at step 160 communication path scheduler 60 determines if all of the data received from application 50 has been transmitted. If so, the session has ended. If not, communication path scheduler 60 returns to step 150 where it remains in a loop until either the data types change or all data has been transmitted.

In another embodiment, at step 160 it is determined whether communication path scheduler 60 received a "terminate" command from application 50. If a terminate command is received, the session is ended. If a terminate command is not received, communication path scheduler 60 returns to step 150 where it remains in a loop until either the data types change or a terminate command is received. This embodiment allows application 50 to send more data in the future without incurring a delay in reestablishing communication paths.

As described, the communication path scheduler 60 dynamically determines appropriate communication paths for transmitting data based on the characteristics of the available communication paths and the type of data.

Several embodiments of the present invention are specifically illustrated and/or described herein. However, it will be appreciated that modifications and variations of the present invention are covered by the above teachings and within the purview of the appended claims without departing from the spirit and intended scope of the invention.

What is claimed is:

1. A method of transmitting data over a plurality of communication paths, the data including a plurality of data types, comprising the steps of:

(a) determining which of the plurality of communication paths are available for transmitting the data;

(b) determining at least one desired quality of service (QOS) characteristic for each of the data types;

(c) selecting at least one of the available communication paths for transmitting each of the data types by matching the desired QOS characteristics to the available communication paths;

(d) signaling to a destination device that will receive at least one of the data types;

(e) initiating the transmission of the data over the selected communication paths;

(f) determining whether the data types included in the data have changed; and (g) if at step (f) it is determined that the data types have changed, repeating steps (a), (b), (c), (d) and (e).

2. The method of claim 1, further comprising the steps of:

(h) determining whether data transmission is complete; and (i) if at step (h) it is determined that data transmission is not complete, repeating steps (f) and (g).

3. The method of claim 1, further comprising the steps of:

(h) determining whether a terminate command has been received; and (i) if at step (h) it is determined that the terminate command has not been received, repeating steps (f) and (g).

4. A computer-readable medium having stored thereon instructions which, when executed by a processor, cause the processor to perform steps to transmit data over a plurality of communication paths, the data including a plurality of data types, said steps comprising:

(a) determining which of the plurality of communication paths are available for transmitting the data;

(b) determining at least one desired quality of service (QOS) characteristic for each of the data types;

(c) selecting at least one of the available communication paths for transmitting each of the data types by matching the desired QOS characteristics to the available communication paths;

(d) signaling to a destination device that will receive at least one of the data types;

(e) initiating the transmission of the data over the selected communication paths;

(f) determining whether the data types included in the data have changed; and (g) if at step (f) it is determined that the data types have changed, repeating steps (a), (b), (c), (d) and (e).

5. The computer-readable medium of claim 4, said steps further comprising:

(h) determining whether data transmission is complete; and (i) if at step (h) it is determined that data transmission is not complete, repeating steps (f) and (g).

6. The computer-readable medium of claim 4, said steps further comprising:

(h) determining whether a terminate command has been received; and (i) if at step (h) it is determined that the terminate command has not been received, repeating steps (f) and (g).

* * * * *